(12) United States Patent
Cailleton

(10) Patent No.: US 10,653,265 B2
(45) Date of Patent: May 19, 2020

(54) MANUALLY OPERATED COFFEE MACHINE

(71) Applicant: HUA KU (SHUNDE) TECH ELECTRIC CO., LTD, Foshan (CN)

(72) Inventor: Hugo Yves Lucien Cailleton, Foshan (CN)

(73) Assignee: HUA KU (SHUNDE) TECH ELECTRIC CO., LTD., Foshan (CN)

( * ) Notice: Subject to any disclaimer, the term of this patent is extended or adjusted under 35 U.S.C. 154(b) by 325 days.

(21) Appl. No.: 15/863,507

(22) Filed: Jan. 5, 2018

(65) Prior Publication Data
US 2018/0228313 A1    Aug. 16, 2018

(30) Foreign Application Priority Data

Feb. 14, 2017   (CN) .................... 2017 2 0134127 U

(51) Int. Cl.
*A47J 31/06*   (2006.01)
*A47J 31/00*   (2006.01)
*A47J 31/40*   (2006.01)
*A47J 31/46*   (2006.01)

(52) U.S. Cl.
CPC ......... *A47J 31/0605* (2013.01); *A47J 31/005* (2013.01); *A47J 31/404* (2013.01); *A47J 31/462* (2013.01)

(58) Field of Classification Search
CPC ........ A47J 31/38; A47J 31/005; A47J 31/462; A47J 31/46; A47J 31/407
USPC ......... 99/279, 287, 288, 295, 297, 299, 307; 426/77, 115, 433
See application file for complete search history.

(56) References Cited

U.S. PATENT DOCUMENTS

| 2,114,063 | A | * | 4/1938 | Stoner ..................... | A47J 31/38 99/305 |
| 3,804,635 | A | * | 4/1974 | Weber ................... | A47J 31/057 99/283 |
| 8,578,839 | B2 | * | 11/2013 | Nielsen ................... | A47J 31/38 99/295 |
| 9,883,765 | B2 | * | 2/2018 | Samso Besora ........ | A47J 31/38 |
| 9,918,582 | B2 | * | 3/2018 | Song ....................... | A47J 31/38 |
| 2008/0302252 | A1 | * | 12/2008 | O'Brien ................ | A47J 31/005 99/302 R |

(Continued)

FOREIGN PATENT DOCUMENTS

CN         103654412 B    4/2016

*Primary Examiner* — Jason L Vaughan
(74) *Attorney, Agent, or Firm* — Oliff PLC

(57) ABSTRACT

An improved manually operated coffee machine. The improved manually operated coffee machine includes a cup body, a water-pressing base body, and a coffee brewing base body that are detachably connected together, and a water storage cavity in communication with the cup body is disposed in the water-pressing base body. Technical essentials are: The water-pressing base body includes an inner housing and an outer housing sleeved over the inner housing, the water-pressing base body is provided with a lock sleeve that inserts from the outer housing into the inner housing and locks the outer housing and the inner housing, and a hand-pressing power rod that extends into the water storage cavity is disposed in the lock sleeve. The present invention is simple in structure, and may be equipped with multiple outer housing accessories for customers to select and use.

9 Claims, 5 Drawing Sheets

(56) References Cited

U.S. PATENT DOCUMENTS

| | | | |
|---|---|---|---|
| 2010/0011966 A1* | 1/2010 | Nielsen | A47J 31/32 99/302 R |
| 2010/0116143 A1* | 5/2010 | Cerroni | A47J 31/005 99/297 |
| 2012/0017767 A1* | 1/2012 | Samso Besora | A47J 31/38 99/302 R |
| 2012/0260806 A1* | 10/2012 | Rolfes | A47J 31/38 99/285 |
| 2013/0186280 A1* | 7/2013 | Sekiguchi | A47J 31/005 99/287 |
| 2013/0213240 A1* | 8/2013 | O'Brien | A47J 31/38 99/297 |
| 2013/0243919 A1* | 9/2013 | Shrader | A23F 5/262 426/433 |
| 2016/0227958 A1* | 8/2016 | Zhao | A47J 31/38 |

* cited by examiner

MANUALLY OPERATED COFFEE MACHINE

BACKGROUND

Technical Field

The present invention relates to a manually operated coffee machine.

Related Art

To satisfy people's needs for drinking coffee, the inventor of the present invention invents a portable manually operated coffee machine of with Patent No. is CN201310345121.5. By means of this product, coffee can be brewed by manually pushing and pulling a water-pressing power piston rod. Many customers like this product. Because the customers pursue different appearance colors of coffee machines, but the appearance color of the coffee machine cannot be changed, when a customer needs different appearance colors, the customer needs to purchase multiple coffee machines. Consequently, a burden is brought to the customer.

SUMMARY

An objective of the present invention is to overcome a disadvantage of the prior art, and to provide an improved manually operated coffee machine whose appearance color is easily changed.

To resolve the foregoing problem, the following technical solutions are used in the present invention.

An improved manually operated coffee machine is provided. The improved manually operated coffee machine includes a cup body, a water-pressing base body, and a coffee brewing base body that are detachably connected together, where a water storage cavity in communication with the cup body is disposed in the water-pressing base body, the water-pressing base body includes an inner housing and an outer housing sleeved over the inner housing, the water-pressing base body is provided with a lock sleeve that inserts from the outer housing into the inner housing and locks the outer housing and the inner housing, and a hand-pressing power rod that extends into the water storage cavity is disposed in the lock sleeve.

The improved manually operated coffee machine described above is characterized in that the inner housing vertically inserts into the outer housing, and the hand-pressing power rod horizontally inserts into the outer housing and the inner housing.

The improved manually operated coffee machine described above is characterized in that an end of the inner housing is provided with an outer circle that is provided with an outer positioning step, and an inner wall of an end of the outer housing is provided with an inner positioning step that abuts against the outer positioning step.

The improved manually operated coffee machine described above is characterized in that a coffee flowing-out base is disposed in the coffee brewing base body, an upper portion of the coffee flowing-out base is provided with a filter block, the coffee flowing-out base is provided with a coffee flowing-out control valve, the coffee flowing-out base is provided with a nozzle sleeve, a coffee flowing-out nozzle having an end extending out of the nozzle sleeve is disposed in the nozzle sleeve, and a spring that supports the coffee flowing-out control valve is disposed in the coffee flowing-out nozzle.

The improved manually operated coffee machine described above is characterized in that the coffee flowing-out base is provided with a bottom opening that accommodates the nozzle sleeve, an inner wall of the bottom opening is provided with multiple bottom opening notches, there is a gap between the coffee flowing-out base and an inner wall of the coffee brewing base body, the nozzle sleeve is threadably connected to the coffee flowing-out base, an outer circle end of the nozzle sleeve is provided with a nozzle sleeve notch, and an outer circumference of an end that is of the coffee flowing-out base and that is threadably connected to the nozzle sleeve is provided with multiple washing notches.

The improved manually operated coffee machine described above is characterized in that a coffee powder cup adaptation ring is detachably connected between the water-pressing base body and the coffee brewing base body.

The improved manually operated coffee machine described above is characterized in that an upper end of the coffee powder cup adaptation ring is threadably connected to the water-pressing base body, and a lower end is threadably connected to the coffee brewing base body.

The improved manually operated coffee machine described above is characterized in that the water-pressing base body is provided with a water output channel in communication with the water storage cavity, the water-pressing base body is provided with a water guiding block, one end face of the water guiding block is provided with a water guiding channel in communication with the water output channel, the other end face of the water guiding block is provided with a convex ring, the convex ring is internally provided with a water guiding hole in communication with the water guiding channel, and the convex ring is provided with a water dividing notch.

The improved manually operated coffee machine described above is characterized in that a cup sleeve is detachably disposed outside the cup body.

The improved manually operated coffee machine described above is characterized in that an outer wall of the cup body is provided with multiple convex strip teeth that arrange a circle, an inner wall of the cup sleeve is provided with at least two anti-rotation clamping teeth that can be clamped into the convex strip teeth, the outer wall of the cup body is provided with a convex ring, and the inner wall of the cup sleeve is provided with multiple positioning buckling strips that are buckled with the convex ring.

Beneficial effects of the present invention are: The water-pressing base body includes the inner housing and the outer housing. In this way, a product may be equipped with multiple outer housing accessories for customers to select and use. After the coffee brewing base body is detached, and after the coffee flowing-out nozzle is pressed down, during washing, water may flow from top to bottom in the coffee brewing base body, facilitating the washing. The nozzle sleeve is provided with the nozzle sleeve notch, the coffee flowing-out base is provided with the washing notches, and the bottom opening of the coffee flowing-out base is provided with the bottom opening notches. In this way, water for washing can enter the inside, facilitating washing the inside clean. By means of the coffee powder cup adaptation ring, the quantity of coffee powder may be increased, so as to use a large cup of coffee powder, increasing generality of the coffee machine. By means of disposing the water guiding block, water does not splash after flowing out from the water output channel, but is divided by using the water dividing notch. The cup sleeve is detachably disposed outside the cup body, so that the cup sleeve may insulate heat and may also be used as a cup.

DETAILED DESCRIPTION

The following further describes the present invention in detail with reference to the accompanying drawings and specific implementations.

Figure 1:
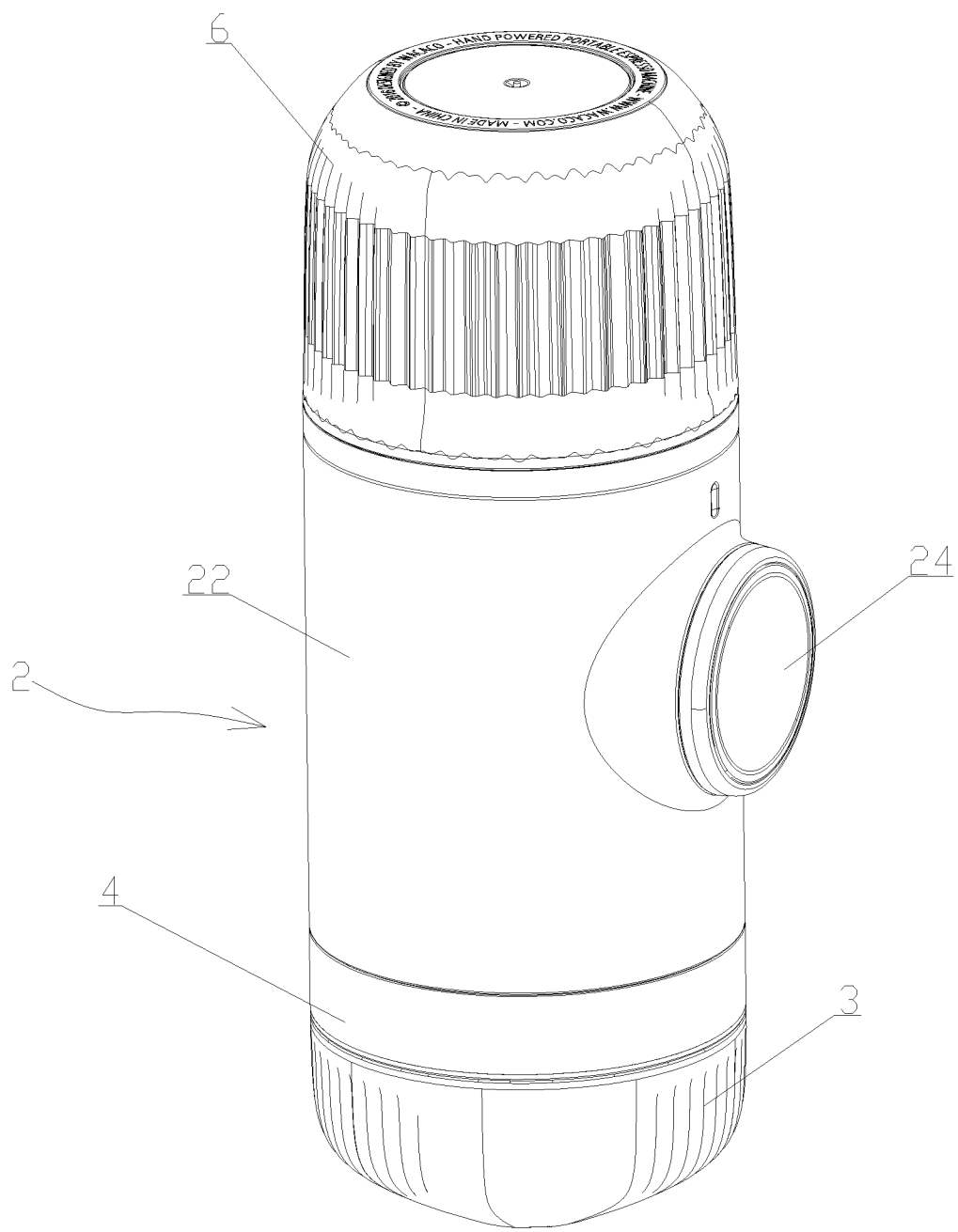
FIG. 1 is a three-dimensional diagram of the present invention.
Figure 2:
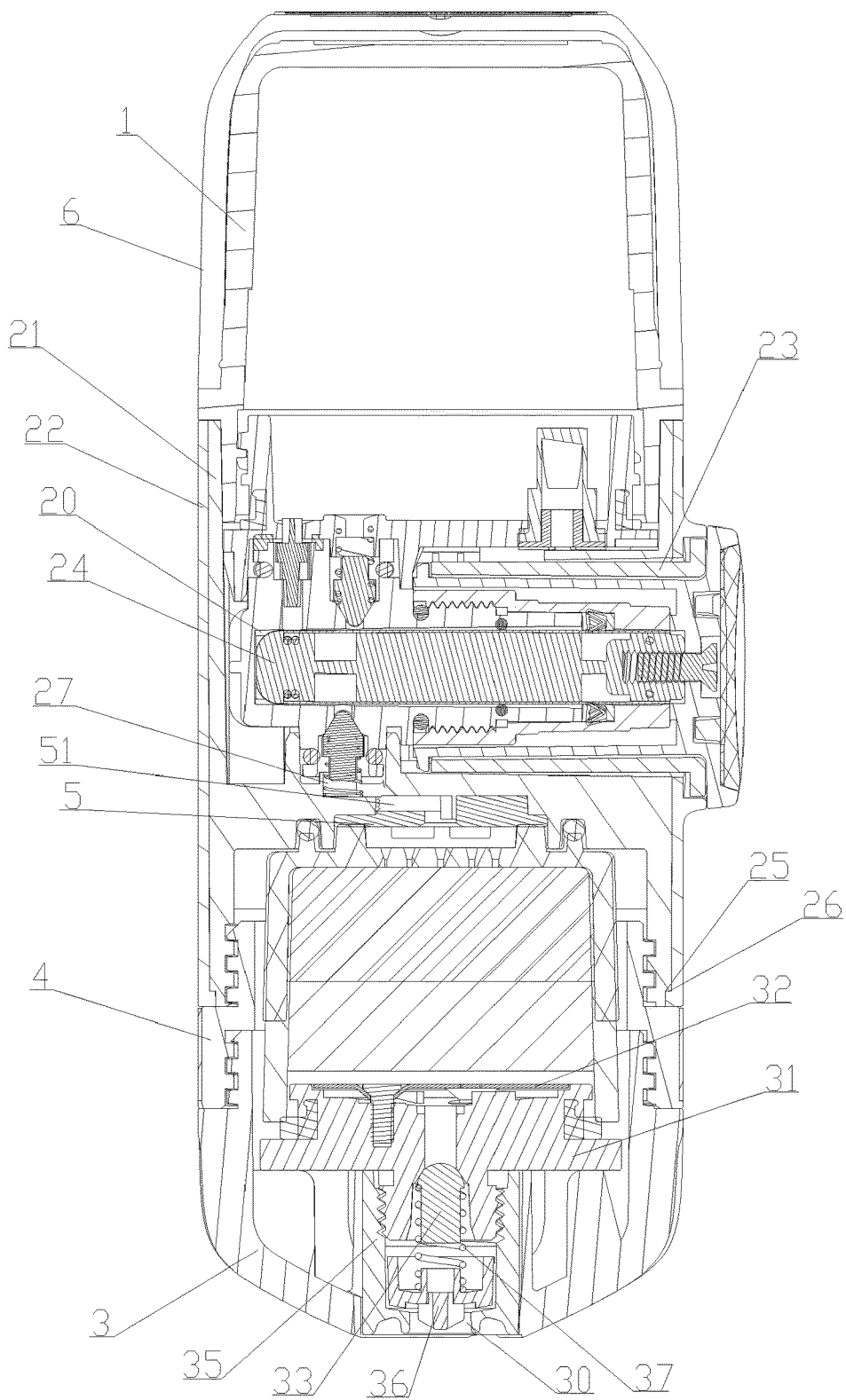
FIG. 2 is a sectional view of the present invention.
Figure 3:
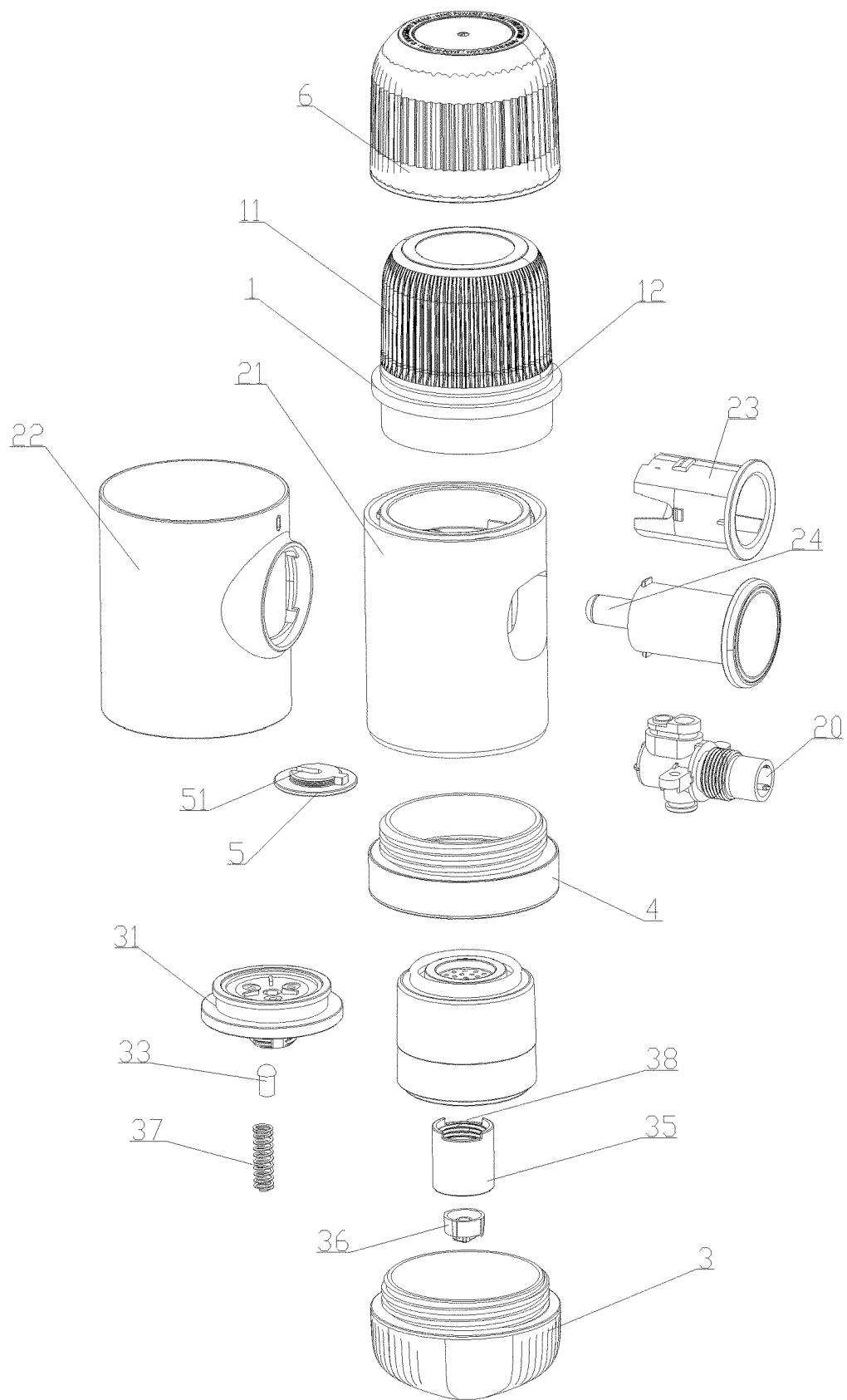
FIG. 3 is an exploded view of the present invention.
Figure 4:
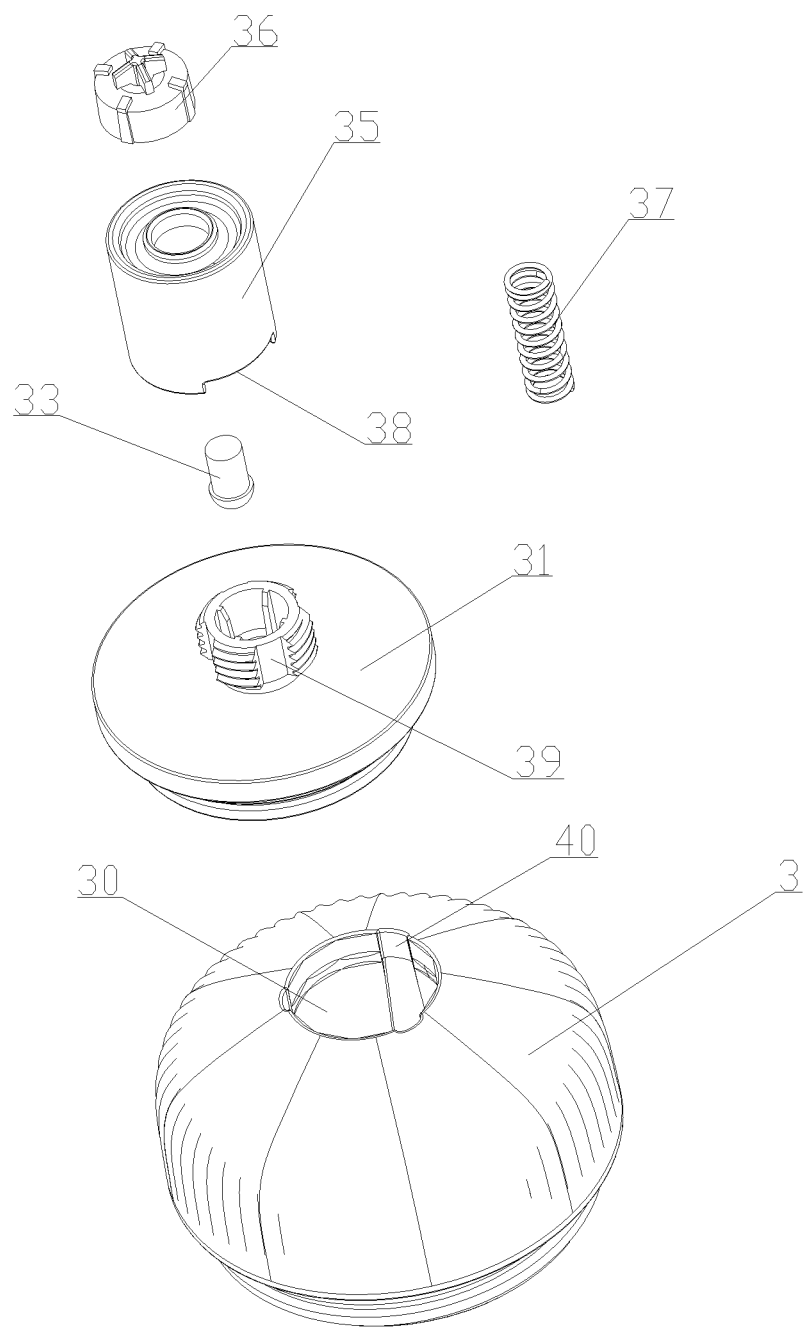
FIG. 4 is an exploded view of a coffee brewing base body according to the present invention.
Figure 5:
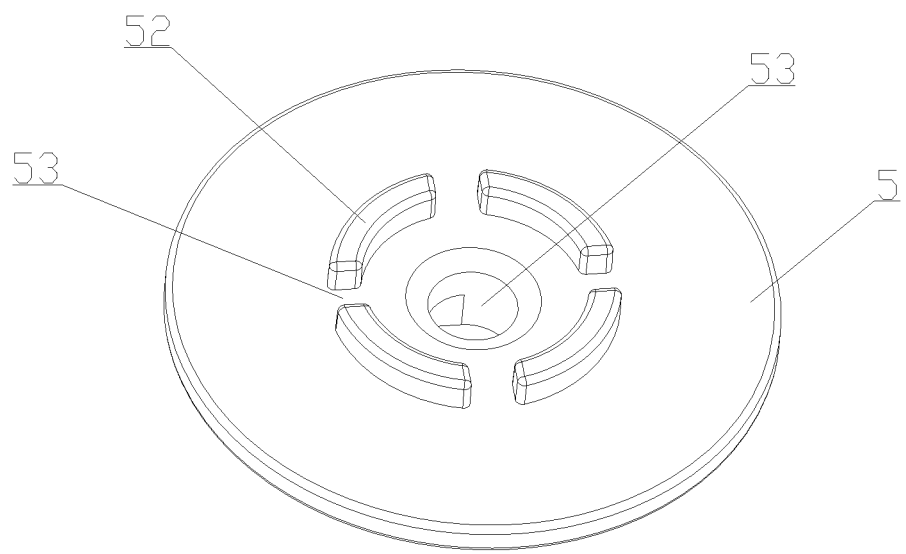
FIG. 5 is a three-dimensional view of a water guiding block according to the present invention.
Figure 6:
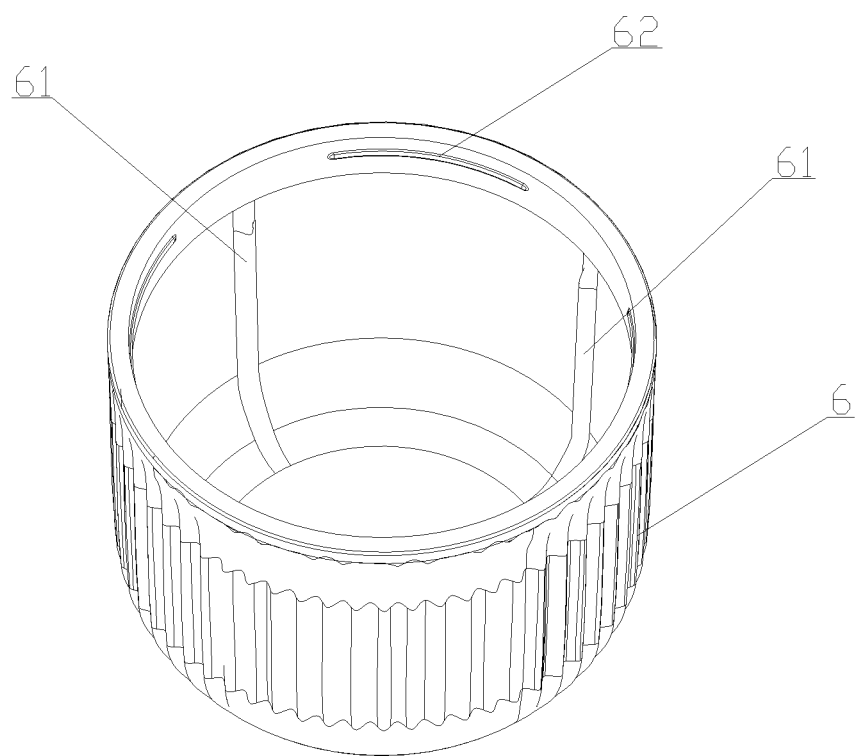
FIG. 6 is a three-dimensional view of a cup sleeve according to the present invention.

As shown in FIG. 1 to FIG. 6, an improved manually operated coffee machine includes a cup body 1, a water-pressing base body 2, and a coffee brewing base body 3 that are detachably connected together. A water storage cavity 20 in communication with the cup body 1 is disposed in the water-pressing base body 2, and the water-pressing base body 2 includes an inner housing 21 and an outer housing 22 sleeved over the inner housing 21. Several outer housings 22 may be additionally provided in accessories, so that customers can change the outer housing 22 according to the their needs. The water-pressing base body 2 is provided with a lock sleeve 23 that inserts from the outer housing 22 into the inner housing 21 and locks the outer housing 22 and the inner housing 21. After the lock sleeve 23 is inserted in, the outer housing 22 and the inner housing 21 cannot be relatively pulled out. A hand-pressing power rod 24 that extends into the water storage cavity 20 is disposed in the lock sleeve 23. The inner housing 21 vertically inserts into the outer housing 22, and the hand-pressing power rod 24 horizontally inserts into the outer housing 22 and the inner housing 21. An end of the inner housing 21 is provided with an outer circle that is provided with an outer positioning step 25, an inner wall of an end of the outer housing 22 is provided with an inner positioning step 26 that abuts against the outer positioning step 25. Vertical positioning is performed by using the positioning steps, to avoid wrong positioning.

A coffee flowing-out base 31 is disposed in the coffee brewing base body 3, an upper portion of the coffee flowing-out base 31 is provided with a filter block 32, the coffee flowing-out base 31 is provided with a coffee flowing-out control valve 33, the coffee flowing-out base 31 is provided with a nozzle sleeve 35, a coffee flowing-out nozzle 36 having an end extending out of the nozzle sleeve 35 is disposed in the nozzle sleeve 35, and a spring 37 that supports the coffee flowing-out control valve 33 is disposed in the coffee flowing-out nozzle 36. After the coffee flowing-out control valve 33 is pressed inward, during washing, water may flow in or flow out from the nozzle sleeve 35, so that it is convenient to clean the inside of the coffee brewing base body 3.

The coffee flowing-out base 31 is provided with a bottom opening 30 that accommodates the nozzle sleeve 35, an inner wall of the bottom opening 30 is provided with multiple bottom opening notches 40, there is a gap between the coffee flowing-out base 31 and an inner wall of the coffee brewing base body 3, the nozzle sleeve 35 is threadably connected to the coffee flowing-out base 31, an outer circle end of the nozzle sleeve 35 is provided with a nozzle sleeve notch 38, and an outer circumference of an end that is of the coffee flowing-out base 31 and that is threadably connected to the nozzle sleeve 35 is provided with multiple washing notches 39. During washing, water may enter the inside through the gap and various notches, so that the inside is washed cleaner.

A coffee powder cup adaptation ring 4 is detachably connected between the water-pressing base body 2 and the coffee brewing base body 3. An upper end of the coffee powder cup adaptation ring 4 is threadably connected to the water-pressing base body 2, and a lower end is threadably connected to the coffee brewing base body 3. When a large cup of powder is needed to be put into an original coffee machine, but the original coffee machine is insufficient for the large cup of powder, a coffee powder cup adaptation ring 4 may be added to improve generality of the coffee machine.

The water-pressing base body 2 is provided with a water output channel 27 in communication with the water storage cavity 20, the water-pressing base body 2 is provided with a water guiding block 5, one end face of the water guiding block is provided with a water guiding channel 51 in communication with the water output channel 27, the other end face of the water guiding block 5 is provided with a convex ring 52, the convex ring 52 is internally provided with a water guiding hole 53 in communication with the water guiding channel 51, and the convex ring 52 is provided with a water dividing notch 53. When the water flows out from the water output channel 27, the water has a particular pressure force. If the water guiding block 5 is not disposed, a column of water rushes downward and easily splashes. After the water guiding block 5 is mounted, after entering the water guiding block 5, the water is divided by the water dividing notch 53, so that the water does not splash.

A cup sleeve 6 is detachably disposed outside the cup body 1. An outer wall of the cup body 1 is provided with multiple convex strip teeth 11 that arrange a circle, and an inner wall of the cup sleeve 6 is provided with at least two anti-rotation clamping teeth 61 that can be clamped into the convex strip teeth 11. The anti-rotation clamping teeth 61 are engaged with the convex strip teeth 11 to prevent the cup body 1 and the cup sleeve 6 from rotating relative to each other. The outer wall of the cup body 1 is provided with a convex ring 12, and the inner wall of the cup sleeve 6 is provided with multiple positioning buckling strips 62 that are buckled with the convex ring 12. The positioning buckling strips 62 are buckled on the convex ring 12, so that the cup sleeve 6 cannot be easily separated from the cup body. If the cup body 1 is filled with hot water, after being sleeved over the cup body 1, the cup sleeve 6 can insulate heat. Certainly, after being detached, the cup sleeve 6 may be used as a cup for brewing coffee.

What is claimed is:

1. An improved manually operated coffee machine, comprising a cup body, a water-pressing base body, and a coffee brewing base body that are detachably connected together, wherein a water storage cavity in communication with the cup body is disposed in the water-pressing base body, the water-pressing base body comprises an inner housing and an outer housing sleeved over the inner housing, the water-pressing base body is provided with a lock sleeve that inserts from the outer housing into the inner housing and locks the outer housing and the inner housing, a hand-pressing power rod that extends into the water storage cavity is disposed in the lock sleeve, and wherein the inner housing vertically inserts into the outer housing, and the hand-pressing power rod horizontally inserts into the outer housing and the inner housing.

2. The improved manually operated coffee machine according to claim 1, wherein an end of the inner housing is provided with an outer circle that is provided with an outer positioning step, and an inner wall of an end of the outer housing is provided with an inner positioning step that abuts against the outer positioning step.

3. The improved manually operated coffee machine according to claim 1, wherein a coffee flowing-out base is disposed in the coffee brewing base body, an upper portion of the coffee flowing-out base is provided with a filter block, the coffee flowing-out base is provided with a coffee flowing-out control valve, the coffee flowing-out base is provided with a nozzle sleeve, a coffee flowing-out nozzle having an end extending out of the nozzle sleeve is disposed in the nozzle sleeve, and a spring that supports the coffee flowing-out control valve is disposed in the coffee flowing-out nozzle.

4. The improved manually operated coffee machine according to claim 3, wherein the coffee flowing-out base is provided with a bottom opening that accommodates the nozzle sleeve, an inner wall of the bottom opening is provided with multiple bottom opening notches, there is a gap between the coffee flowing-out base and an inner wall of the coffee brewing base body, the nozzle sleeve is threadably connected to the coffee flowing-out base, an outer circle end of the nozzle sleeve is provided with a nozzle sleeve notch, and an outer circumference of an end that is of the coffee flowing-out base and that is threadably connected to the nozzle sleeve is provided with multiple washing notches.

5. The improved manually operated coffee machine according to claim 1, wherein a coffee powder cup adaptation ring is detachably connected between the water-pressing base body and the coffee brewing base body.

6. The improved manually operated coffee machine according to claim 5, wherein an upper end of the coffee powder cup adaptation ring is threadably connected to the water-pressing base body, and a lower end is threadably connected to the coffee brewing base body.

7. The improved manually operated coffee machine according to claim 1, wherein the water-pressing base body is provided with a water output channel in communication with the water storage cavity, the water-pressing base body is provided with a water guiding block, one end face of the water guiding block is provided with a water guiding channel in communication with the water output channel, the other end face of the water guiding block is provided with a convex ring, the convex ring is internally provided with a water guiding hole in communication with the water guiding channel, and the convex ring is provided with a water dividing notch.

8. The improved manually operated coffee machine according to claim 1, wherein a cup sleeve is detachably disposed outside the cup body.

9. The improved manually operated coffee machine according to claim 8, wherein an outer wall of the cup body is provided with multiple convex strip teeth that remain the same circle, an inner wall of the cup sleeve is provided with at least two anti-rotation clamping teeth that can be clamped into the convex strip teeth, the outer wall of the cup body is provided with a convex ring, and the inner wall of the cup sleeve is provided with multiple positioning buckling strips that are buckled with the convex ring.

* * * * *